(12) United States Patent
Chang et al.

(10) Patent No.: US 8,774,042 B2
(45) Date of Patent: Jul. 8, 2014

(54) COMMUNICATION APPARATUS WITH TRANSMITTED RATE DETECTING FUNCTION AND METHOD THEREOF

(75) Inventors: Ting-Kang Chang, New Taipei (TW);
Po-Wei Liu, Hsinchu County (TW);
Jui-Chiang Wang, Hsinchu (TW);
Jen-Hao Yeh, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 155 days.

(21) Appl. No.: 13/441,003

(22) Filed: Apr. 6, 2012

(65) Prior Publication Data

US 2012/0257889 A1 Oct. 11, 2012

(30) Foreign Application Priority Data

Apr. 8, 2011 (TW) .............................. 100112277 A

(51) Int. Cl.
*H04L 12/26* (2006.01)
(52) U.S. Cl.
USPC .......................................................... 370/252

(58) Field of Classification Search
None
See application file for complete search history.

(56) References Cited

U.S. PATENT DOCUMENTS

2005/0036595 A1* 2/2005 Sidhu et al. ................ 379/93.08

FOREIGN PATENT DOCUMENTS

TW 201008345 2/2010

* cited by examiner

*Primary Examiner* — Kevin C Harper
(74) *Attorney, Agent, or Firm* — Winston Hsu; Scott Margo

(57) ABSTRACT

A communication apparatus with transmitted rate detecting function and the method therefore is provided. The communication apparatus receives an input signal transmitted at a first rate or a second rate from a remote apparatus. The method includes setting the communication apparatus to operate at an initial receiving rate; sampling the input signal by a specific sampling frequency to generate a sample result; estimating the input transmitted rate of the input signal according to the sample result so as to set the receiving rate of the communication apparatus at a working rate; and communicating with the remote apparatus at the working rate. The second rate is higher than the first rate, and the specific sampling frequency is associated with the initial receiving rate.

17 Claims, 4 Drawing Sheets

COMMUNICATION APPARATUS WITH TRANSMITTED RATE DETECTING FUNCTION AND METHOD THEREOF

BACKGROUND OF THE INVENTION

1. Field of the Invention

The present invention relates to a signal processing scheme, and more particularly to a communication apparatus and a method used for signal processing in a Physical layer.

2. Description of the Prior Art

Since data transmission/processing rates may be different in different devices, there is a possibility that a conventional communication system is unable to properly establish a data communication link with another communication device. An optical fiber network supports data transmission/processing rates of 125 megabit per second and 1250 megabit per second. A conventional method is provided to manually configure/set the desired data transmission/processing rate of a local communication circuit before the production factory. For example, the conventional method may be used to manually configure the desired data transmission rate as 1250 megabits per second. This, however, introduces some significant defects in certain situations. For instance, when the local communication circuit is connected to an optical fiber network having a different data transmission/processing rate, the data rate of the local communication circuit can not be modified or altered. Accordingly, in this situation, the local communication circuit is unable to properly communicate with a remote communication circuit.

SUMMARY OF THE INVENTION

Therefore, one objective of the present invention is to provide a communication apparatus and corresponding method for detecting a transmitted rate of an input signal to appropriately select a proper receiving/working rate so as to enable data communication with another communication device.

According to an embodiment of the present invention, a transmitted rate detecting method of a communication apparatus is disclosed. The communication apparatus is used for receiving an input signal transmitted from a remote apparatus at a first rate or a second rate, and the method comprises: receiving the input signal with an initial receiving rate; sampling the input signal with a specific sample frequency to generate a sample result; determining an input transmitted rate of the input signal according to the sample result so as to set a receiving rate of the communication apparatus as a working rate; and communicating with the remote apparatus at the working rate; wherein the second rate is higher than the first rate, and the specific sample frequency is associated with the initial receiving rate.

According to the embodiment of the present invention, a communication apparatus for receiving an input signal transmitted from a remote apparatus at a first rate or a second rate which is higher than the first rate is disclosed. The communication apparatus comprises a receiving circuit, a detecting circuit, and a processing circuit. The receiving circuit is used for receiving the input signal with an initial receiving rate and sampling the input signal with a specific sample frequency to generate a sample result. The detecting circuit is coupled to the receiving circuit and used for determining an input transmitted rate of the input signal according to the sample result and setting a receiving rate of the communication apparatus as a working rate according to the input transmitted rate. The processing circuit is coupled to the receiving circuit and used for receiving the sample result. The receiving circuit and the processing circuit are arranged to communicate with the remote apparatus according to the working rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
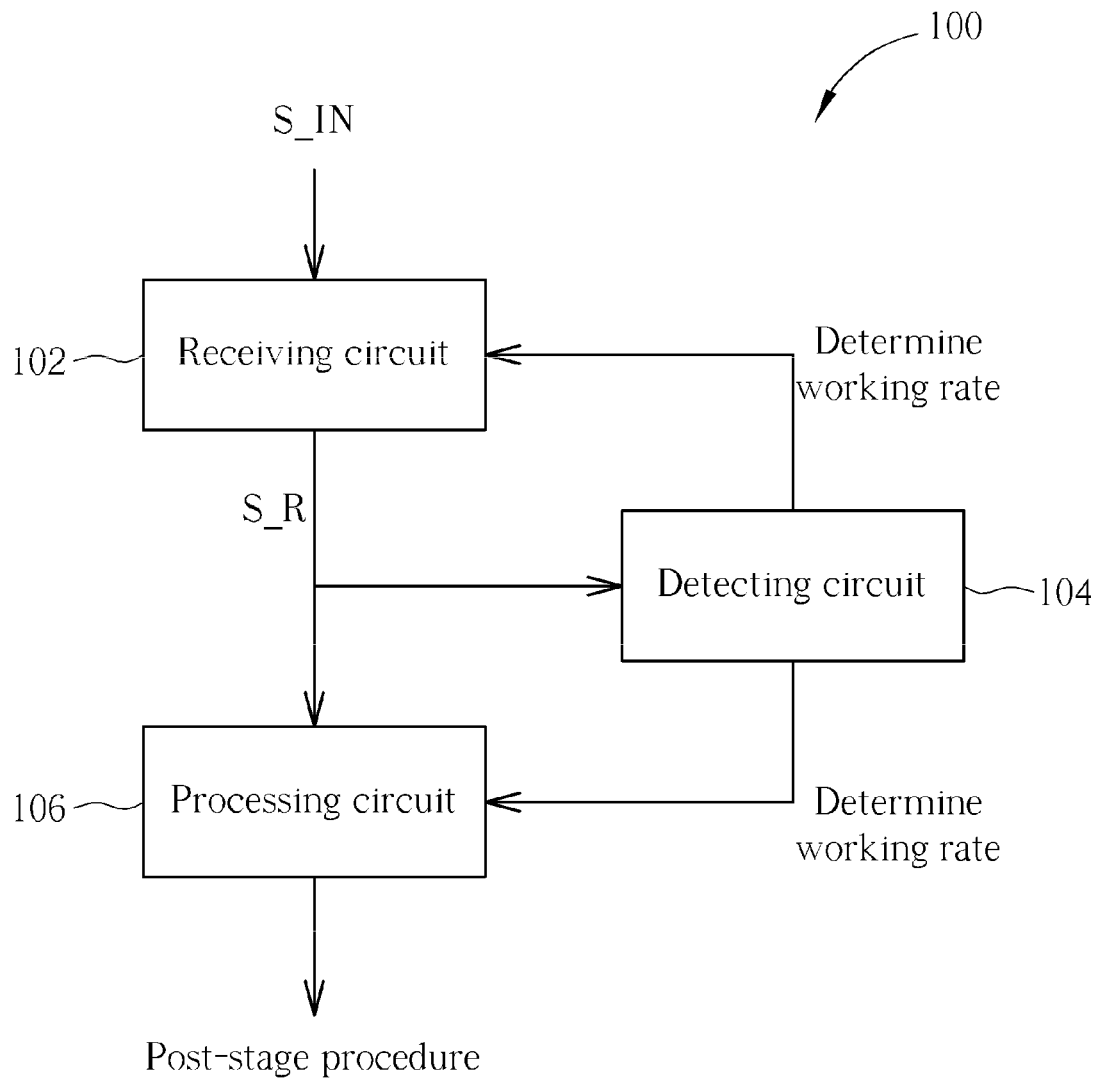
FIG. 1 is a block diagram of a communication apparatus according to an embodiment of the present invention.

Please refer to FIG. 1, which is a block diagram of a communication apparatus 100 according to an embodiment of the present invention. The communication apparatus 100 is able to selectively operate at a first rate or a second rate, wherein the second rate is higher than the first rate. In addition, the communication apparatus 100 can be implemented by a communication device which complies with IEEE 802.3 Standard and is responsible for receiving or transmitting signals of a Physical layer of Ethernet. In an example of an optical fiber network in which the communication apparatus 100 is used, the receiving circuit 102 includes photoelectric elements for converting an optical communication signal transferred via the optical fiber network into an electric signal and sampling the electric signal to obtain a digital signal. The processing circuit 106 performs further processing on the digital signal which is obtained by sampling the electric signal and provides the processed result for a post-stage procedure/circuit. The input signal S_IN, a group of data transmitted from a remote apparatus to the communication apparatus 100, may be transmitted at the first rate or the second rate. Initially, the receiving rate of the communication apparatus 100 can be configured as an initial receiving rate, and then selectively changed to a different receiving rate according to the input transmitted rate of the input signal S_IN afterwards. Further, the processing circuit 106 can be switched to different modes correspondingly according to the input transmitted rate.

In an initial stage, the communication apparatus 100 starts receiving the input signal S_IN transmitted in a transmitted rate from the remote apparatus. In this situation, the communication apparatus 100 is configured to receive the input signal S_IN at an initial receiving rate (i.e. the initial working rate of the communication apparatus 100). The receiving circuit 102 is utilized for sampling the input signal S_IN with a specific sample frequency to generate a sample result S_R, and the specific sample frequency is associated with the initial receiving rate. For example, the specific sample frequency may be designed to be equal to the data frequency of the initial receiving rate or a multiple of the data frequency. The sample result S_R is provided to the detecting circuit 104 and the processing circuit 106. The detecting circuit 104 is utilized for determining the input transmitted rate of the input signal S_IN according to the signal change and statistic property of the sample result S_R, and then configuring/setting the receiving rate of the communication apparatus 100 to be a working rate according to the input transmitted rate. Accordingly, the communication apparatus 100 can properly communicate with the remote apparatus at the working rate. In addition, the sample result S_R may include a data signal DATA and a clock signal CLK.

In this embodiment, the detecting circuit 104 can obtain the signal property of the sample result S_R by taking a sample of the sample result S_R and gathering statistics for the sample result S_R, to determine the corresponding transmitted rate of the input signal S_IN. For illustrative purposes, the corresponding transmitted rate of the input signal S_IN is named as a first rate or a second rate in the following description. In an embodiment, the first rate is a low transmission rate as 125 megabit per second (Mb/s), and the second rate is a high transmission rate as 1250 megabit per second. The receiving circuit 102 employs the specific sample frequency which is higher than the data frequency of the first rate. For example, the initial receiving rate of the communication apparatus 100 can be configured to be the second rate according to a default setting, and the specific sample frequency can be the same as the data frequency of the second rate. Employing the specific sample frequency that is the same as the data frequency of the second rate is preferable in this embodiment; however, this is not intended to be a limitation of the present invention. The specific sample frequency can be any frequency that is higher than the data frequency of the first rate without the limitation of being equal to the data frequency of the second rate. In addition, the above-mentioned detection method is not limited to a network only including two different transmitted rates, and can be applied to networks including a variety of transmitted rates. Theses modification described above all fall within the scope of the present invention.

In the present embodiment, the communication apparatus 100 is described in a receiving mode, hence the receiving elements are shown only. In other embodiments, the communication apparatus 100 comprises the transmission elements and also changes the working rate of the transmission elements accordingly.

Figure 2A:
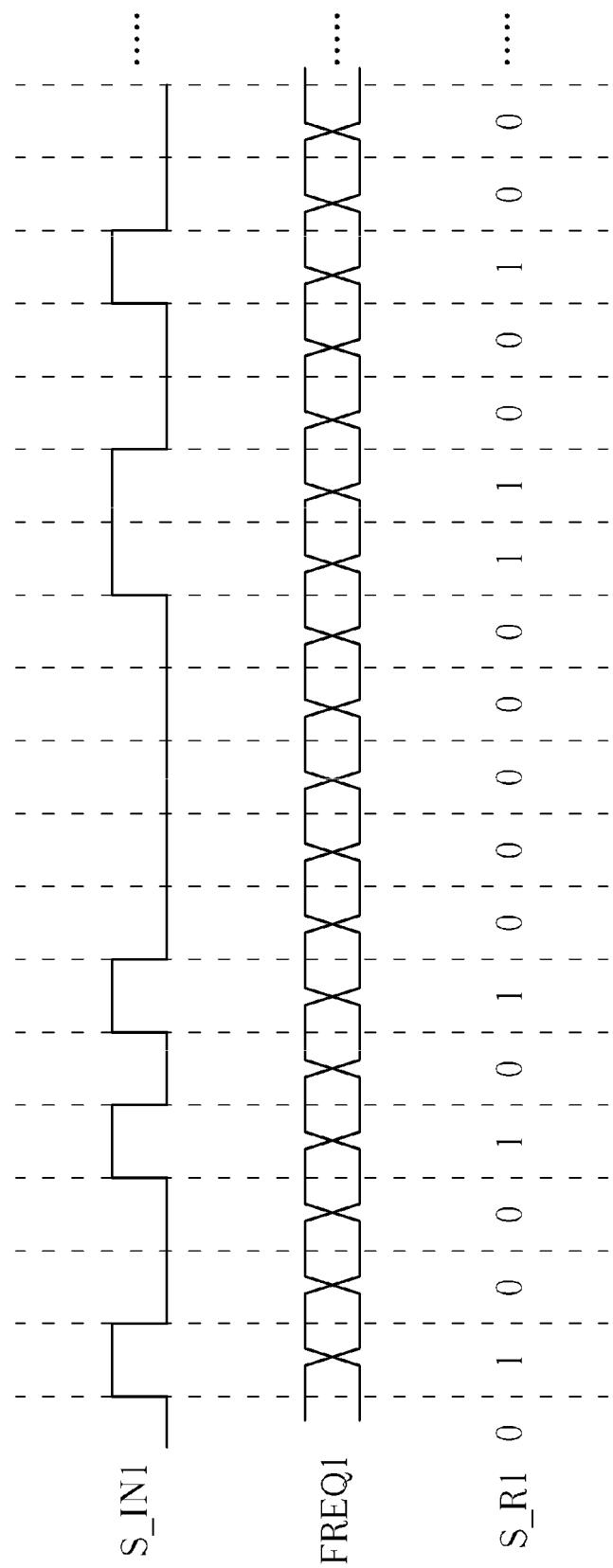
FIG. 2A and FIG. 2B respectively illustrate waveform diagrams of input signals, sample frequencies, and sample results generated by sampling the input signal of FIG. 1 having different input transmitted rates.
Figure 2B:
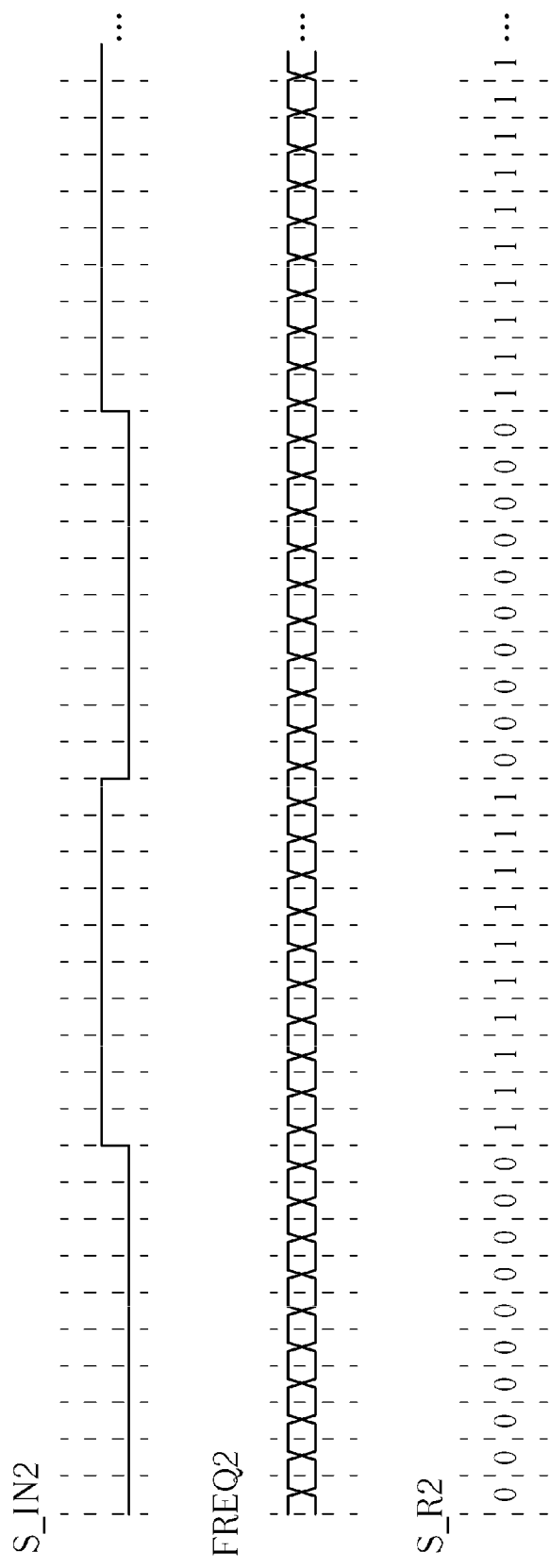

Please refer to FIG. 2A and FIG. 2B. FIG. 2A and FIG. 2B respectively shown the waveform diagrams of sample results generated by sampling the input signal of FIG. 1 having different input transmitted rates. The communication apparatus 100 shown in FIG. 1 employs a frequency that is equal to the data frequency of the second rate as the specific sample frequency and performs sampling on the input signal S_IN to generate the sample result S_R in accordance with the specific sample frequency. FIG. 2A illustrates the waveform of an input signal S_IN1 transmitted at the second rate (i.e. 1250 megabits per second) and a corresponding sample result S_R1 generated by sampling the input signal S_IN1 with a specific sample frequency FREQ1 of 1250 megahertz per second. FIG. 2B illustrates the waveform of an input signal S_IN2 transmitted at the first rate (i.e. 125 megabits per second) and a corresponding sample result S_R2 generated by sampling the input signal S_IN2 with a specific sample frequency FREQ2 of 1250 megahertz per second. For fully presenting the signal changes of the input signal S_IN2, the timeline of FIG. 2B is longer than that of FIG. 2A. As shown in FIG. 2A, the sample frequency FREQ1 is equal to 1250 MHZ, and the time interval between two adjacent sample points is equal to 0.8 nanoseconds. A data bit '0' or '1' is obtained at each sampling time point. As shown by the sample result S_R1, the distribution of these data bits '1' and '0' is associated with the data content of the input signal S_IN1 displayed on the timeline. Since the input signal S_IN1 is transmitted at the second rate (i.e. a higher transmitted rate), bit changes indicated by the sample result S_R1 satisfy some particular conditions. For example, ideally, there are usually two consecutive identical data bits in the sample result S_R1 but almost no consecutive identical data bits including at least six bits occur in the sample result S_R1. In this description, a symbol is employed to indicate a segment formed by N consecutive identical bits. The segment formed by N consecutive identical bits '0' is referred to as a first symbol, and the segment formed by N consecutive identical bits '1' is referred to as a second symbol. The value of N can be a positive integer such as three or a multiple of three. Preferably, N is an integer equal to or greater than five. As shown in FIG. 2B, the frequency of the sample frequency FREQ2 is the same as 1250 MHZ, and the time interval between two adjacent sample points is still equal to 0.8 nanoseconds. Since the input signal S_IN2 is transmitted at a lower transmitted rate (i.e. the first rate), the first symbol or second symbol formed by multiple identical bits usually occurs in the sample result S_R2.

As mentioned above, by gathering statistics for the distribution of the first and second symbols of the sample result S_R1 and the sample result S_R2, the detecting circuit 104 can determine the input transmitted rate to which an input signal corresponds. In addition, the detecting circuit 104 can also determine the input transmitted rate by analyzing the appearing regular patterns of the first and second symbols respectively in the sample results S_R1 and S_R2. The detecting circuit 104 can employ different methods to gather different statistics for the distribution of the symbols on the timeline so as to determine the corresponding transmitted rate of the input signal. For illustrative purposes, in the following, the detecting circuit 104 preferably employs several methods to gather statistics for the distribution of the symbols. Please note this is not indented to be a limitation of the present invention. In a first example, the detecting circuit 104 is arranged to gather statistics for the distribution of the symbols so as to obtain an average time period of a symbol's occurrence, and then determine the transmitted rate of the input signal S_IN to generate a determination result by deciding whether the average time period falls within a reasonable predetermined range. The working rate of the communication apparatus 100 can be determined based on the determination result. Particularly, when gathering statistics for the symbol formed by at least five identical bits in the sample result S_R1, the detecting circuit 104 can detect that the average time period of the symbol's occurrence is equal to thirty clock cycles. When statistics for the symbol formed by at least five identical bits in the sample result S_R2 are gathered, the detecting circuit 104 can detect that the average time period of the symbol's occurrence is equal to ten clock cycles. Based on the above-mentioned properties, when the average time period of the symbol's occurrence is smaller and falls within a predetermined range (e.g. the average time period is smaller than 12 clock cycles), this implies that the input signal S_IN2 should correspond to a lower transmitted rate, and the detecting circuit 104 can determine the working rate of the communication apparatus 100 as the first rate which is substantially equal to the lower transmitted rate of the input signal S_IN2. When the average time period of the symbol's occurrence exceeds the predetermined range, this implies that the input signal S_IN1 should correspond to a higher transmitted rate, and the detecting circuit 104 can determine the working rate of the communication apparatus 100 as the second rate which is substantially equal to the higher transmitted rate of the input signal S_IN.

In addition, the detecting circuit 104 can compare the average time period of the symbol's occurrence with a reference value to decide which transmitted rate corresponds to the input signal S_IN. For example, the reference value can be configured as ten. When the difference between the reference value and the number of clock cycles corresponding to the average time period is not greater than three, the detecting circuit 104 can determine that the transmitted rate corresponding to the input signal S_IN2 is equal to the first rate. For instance, if the average time period of the symbol's occurrence in the sample result S_R2 is ten clock cycles, then this indicates that the difference between the number of clock cycles and the reference value is equal to zero which is smaller than three, and the detecting circuit 104 determines that the transmitted rate corresponding to the input signal S_IN2 is equal to the first rate. Otherwise, when the difference between the reference value and the number of clock cycles corresponding to the average time period is greater than three, the detecting circuit 104 can determine that the transmitted rate corresponding to the input signal S_IN1 is equal to the second rate. For instance, if the average time period of the symbol's occurrence in the sample result S_R1 is thirty clock cycles, then this indicates that the difference between the number of clock cycles and the reference value is equal to twenty, and the detecting circuit 104 determines that the transmitted rate corresponding to the input signal S_IN1 is equal to the second rate. After determining the transmitted rate corresponding to the input signal, the detecting circuit 104 can decide the working rate of the communication apparatus 100 in accordance with the above-mentioned determination result. The communication apparatus 100 correspondingly switches to an operation mode associated with the working rate. For example, when determining that the input signal is transmitted at the first rate, the detecting circuit 104 is arranged to configure the working rate of the communication apparatus 100 as the first rate to communicate with the remote apparatus. Similarly, when determining that the input signal is transmitted at the second rate, the detecting circuit 104 is arranged to configure the working rate of the communication apparatus 100 as the second rate to communicate with the remote apparatus. It should be noted that the design of the reference value mentioned above is merely used for illustrative purposes. This is not meant to be a limitation of the present invention. In addition, the method for gathering the average clock cycle of the symbol's occurrence can be modified or replaced by gathering statistics for a time interval between two adjacent symbol's occurrences. All these modifications obey the spirit of the present invention.

In another embodiment, the detecting circuit 104 is arranged to gather statistics for the number of the first symbol and the number of the second symbol occurring in the sample result S_R during a specific time period wherein the first symbol is formed by consecutive bits '0' including at least five bits and the second symbol is formed consecutive bits '1' including at least five bits. The detecting circuit 104 generates a difference value DIF by comparing the number of the first symbol with the number of the second symbol, and then decides the transmitted rate of the input signal S_IN according to the different value DIF. In this embodiment, the difference value DIF represents a difference between the probability of the first symbol's occurrence and the probability of the second symbol's occurrence. For example, the sample result S_R2 includes two first symbols and two second symbols. Accordingly, the difference between the numbers of the first and second symbols is equal to zero. That is, the value DIF is zero, and this implies that the probability of the first symbol's occurrence is equal to the probability of the second symbol's occurrence. In another case, when the input signal such as S_IN1 is transmitted at the second rate which is substantially equal to the higher transmitted rate, the corresponding sample result S_R1 includes a single first symbol and zero second symbols. The difference between the numbers of the first and second symbols is equal to one. That is, the value DIF is equal to one. Thus, when the input signal S_IN1 is transmitted at the second rate, the difference between the probabilities of the first symbol's occurrence and the second symbol's occurrence becomes higher. In other words, the value DIF becomes higher. Based on this property, the detecting circuit 104 can calculate the value DIF by comparing the number of the first symbol with the number of the second symbol, and configure a threshold value to compare the value DIF with the threshold value so as to determine a transmitted rate to which the input signal S_IN corresponds.

In another embodiment, the detecting circuit 104 can gather statistics for the first and second symbols in the sample result during a specific time period wherein the first symbol includes consecutive identical bits '0' including at least five bits and the second symbol includes consecutive identical bits '1' including at least five bits. After gathering statistics for the distribution of first symbols and the second symbols, the detecting circuit 104 is arranged to determine whether the first symbol and the second symbol alternately occur in the sample result, to determine a transmitted rate to which the input signal S_IN corresponds so as to generate the determination result. Please refer to FIG. 2A and FIG. 2B again. As shown in FIG. 2A, when the input signal such as S_IN1 is transmitted at the second rate (i.e. the higher transmitted rate), there is a lower probability of the first and second symbols' occurrences in the sample result S_R1. Even though the first symbol or the second symbol occurs in the sample result S_R1, the first symbol and the second symbol do not occur alternately. In another case, as shown in FIG. 2B, when the input signal such as S_IN2 is transmitted at the first rate (i.e. the lower transmitted rate), the first symbol and the second symbol alternately occur in the sample result S_R2. Thus, the detecting circuit 104 can detect a transmitted rate to which the input signal corresponds by determining whether the first symbol and the second symbol alternately occur in the sample result.

Figure 3:
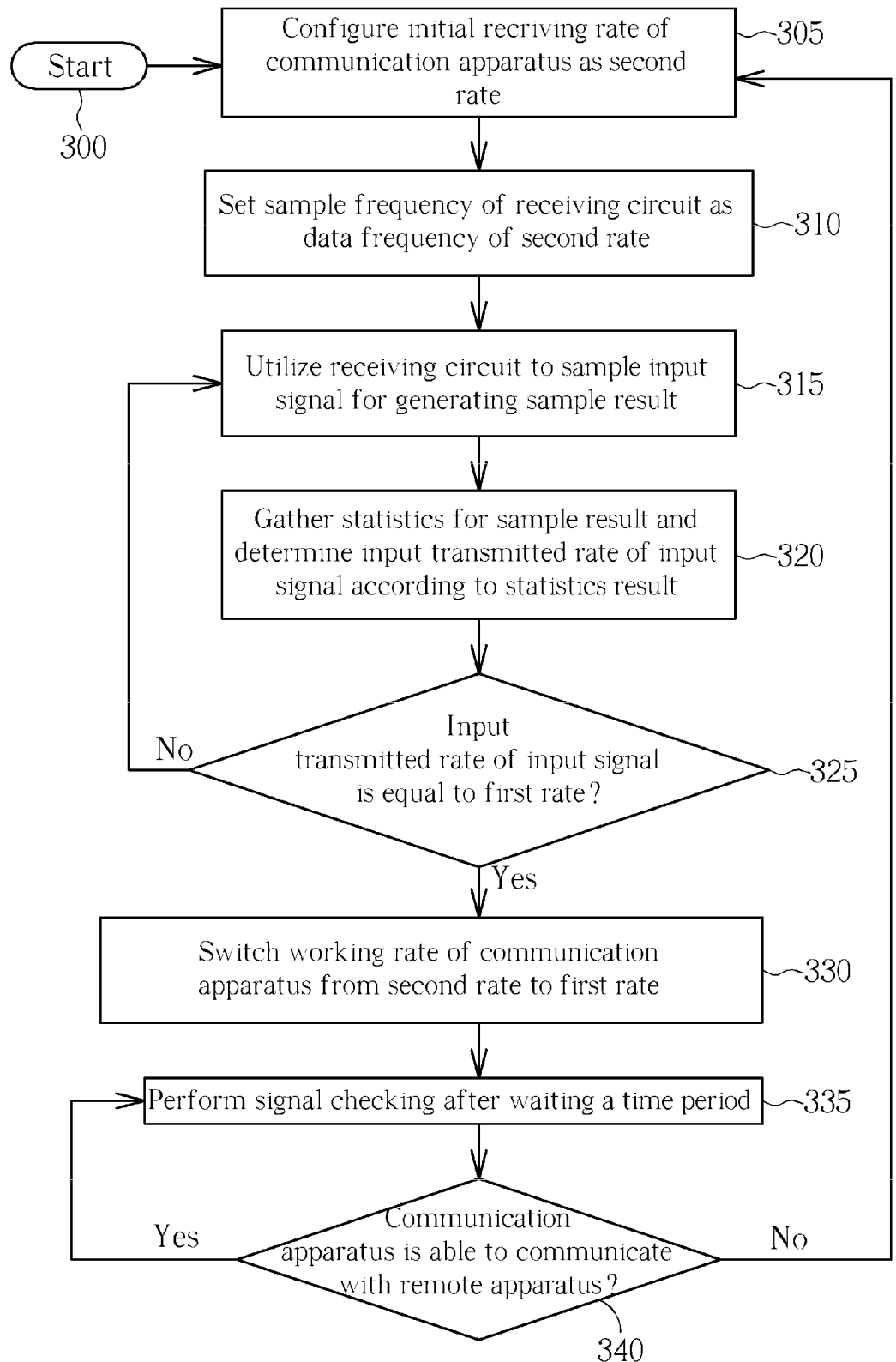
FIG. 3 is a flowchart diagram of a transmitted rate detection method according to an embodiment of the present invention.

FIG. 3 is a diagram illustrating a flowchart of a transmitted rate detection method according to an embodiment of the present invention. The initial working/receiving rate of the communication apparatus 100 as shown in FIG. 1 is configured as the second rate, and the specific sample frequency employed by the receiving circuit 102 is equal to the data frequency of the second rate. The detecting circuit 104 determines a transmitted rate to which the input signal S_IN corresponds in accordance with the sample result S_R so as to determine whether the working rate of the communication apparatus 100 should be switched from the second rate to the first rate or whether the working rate should be maintained at the second rate. The description of the above steps is detailed in the following:

Step 300: Start;

Step 305: Configure the initial receiving rate of the communication apparatus as the second rate;

Step 310: Set the sample frequency of the receiving circuit as the data frequency of the second rate;

Step 315: Utilize the receiving circuit 102 to sample the input signal for generating a sample result;

Step 320: Gather statistics for the sample result and determine the input transmitted rate of the input signal according to the statistics result;

Step 325: Is the input transmitted rate of the input signal equal to the first rate?

Step 330: Switch the working rate of the communication apparatus 100 from the second rate to the first rate;

Step 335: Perform signal checking after waiting a time period; and

Step 340: Is the communication apparatus able to communicate with the remote apparatus?

As is well known to those skilled in the art, the communication apparatus 100 is a signal transceiver. In other words, in addition to receiving the input signal, the communication apparatus 100 can be also used to transmit an output signal to the remote apparatus. The transmitted rate of the output signal can also be switched between different rates according to the determination result corresponding to the input transmitted rate of the input signal. Thus, the communication apparatus 100 can properly communicate with the remote apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitted rate detecting method of a communication apparatus, the communication apparatus used for receiving an input signal transmitted from a remote apparatus at a first rate or a second rate, the transmitted rate detecting method comprising:
   receiving the input signal with an initial receiving rate;
   sampling the input signal with a specific sample frequency to generate a sample result;
   determining an input transmitted rate of the input signal according to the sample result so as to set a receiving rate of the communication apparatus as a working rate; and
   communicating with the remote apparatus at the working rate;
   wherein the second rate is higher than the first rate, and the specific sample frequency is associated with the initial receiving rate; and the step of determining the input transmitted rate of the input signal according to the sample result so as to set the receiving rate of the communication apparatus as the working rate comprises:
      gathering statistics for an average of clock cycles of a first symbol's occurrence or a second symbol's occurrence in the sample result, wherein the first symbol is formed by a segment of at least N consecutive bits '0', and the second symbol is formed by a segment of at least N consecutive bits '1';
      deciding the input transmitted rate by determining whether the average of clock cycles falls within a predetermined range so as to generate a determination result; and
      setting the working rate as the first rate or the second rate according to the determination result.

2. The transmitted rate detecting method of claim 1, wherein the initial receiving rate is equal to the second rate.

3. The transmitted rate detecting method of claim 2, wherein the specific sample frequency is equal to a frequency of the second rate.

4. The transmitted rate detecting method of claim 1, wherein the initial receiving rate is higher than the first rate, and the specific sample frequency is equal to a data frequency of the initial receiving rate.

5. A transmitted rate detecting method of a communication apparatus, the communication apparatus used for receiving an input signal transmitted from a remote apparatus at a first rate or a second rate, the transmitted rate detecting method comprising:
   receiving the input signal with an initial receiving rate;
   sampling the input signal with a specific sample frequency to generate a sample result;
   determining an input transmitted rate of the input signal according to the sample result so as to set a receiving rate of the communication apparatus as a working rate; and
   communicating with the remote apparatus at the working rate;
   wherein the second rate is higher than the first rate, and the specific sample frequency is associated with the initial receiving rate; and the step of determining the input transmitted rate of the input signal according to the sample result so as to set the receiving rate of the communication apparatus as the working rate comprises:
      gathering statistics for a first symbol and a second symbol in the sample result to determine the input transmitted rate so as to generate a determination result; and
      setting the working rate as the first rate or the second rate according to the determination result;
      wherein the first symbol is formed by a segment of at least N consecutive bits '0', and the second symbol is formed by a segment of at least N consecutive bits '1'; and the step of gathering the statistics for the first symbol and the second symbol in the sample result to determine the input transmitted rate comprises:
         gathering statistics for a number of the first symbol to generate a first number;
         gathering statistics for a number of the second symbol to generate a second number;
         subtracting the first number from the second number to generate a difference value; and
         determining the input transmitted rate according to the difference value.

6. The transmitted rate detecting method of claim 5, wherein the step of determining the input transmitted rate according to the difference value comprises:
   determining the input transmitted rate as the second rate when an error between the difference value and a reference value is smaller than a threshold value; and
   determining the input transmitted rate as the first rate when the error between the difference value and the reference value is greater than the threshold value.

7. A transmitted rate detecting method of a communication apparatus, the communication apparatus used for receiving an input signal transmitted from a remote apparatus at a first rate or a second rate, the transmitted rate detecting method comprising:
   receiving the input signal with an initial receiving rate;
   sampling the input signal with a specific sample frequency to generate a sample result;
   determining an input transmitted rate of the input signal according to the sample result so as to set a receiving rate of the communication apparatus as a working rate; and
   communicating with the remote apparatus at the working rate;
   wherein the second rate is higher than the first rate, and the specific sample frequency is associated with the initial receiving rate; and the step of determining the input transmitted rate of the input signal according to the sample result so as to set the receiving rate of the communication apparatus as the working rate comprises:
      gathering statistics for a first symbol and a second symbol in the sample result to determine the input transmitted rate so as to generate a determination result; and
      setting the working rate as the first rate or the second rate according to the determination result;
      wherein the first symbol is formed by a segment of at least N consecutive bits '0', and the second symbol is formed by a segment of at least N consecutive bits '1'; and the step of gathering the statistics for the first symbol and the second symbol in the sample result to determine the input transmitted rate comprises:
determining the input transmitted rate by determining whether the first symbol and the second symbol alternately occur in the sample result.

8. A communication apparatus for receiving an input signal transmitted from a remote apparatus at a first rate or a second rate, the second rate is higher than the first rate, the communication apparatus comprising:
a receiving circuit, receiving the input signal with an initial receiving rate and sampling the input signal with a specific sample frequency to generate a sample result;
a detecting circuit, coupled to the receiving circuit, determining an input transmitted rate of the input signal according to the sample result, and setting a receiving rate of the communication apparatus as a working rate according to the input transmitted rate; and
a processing circuit, coupled to the receiving circuit, receiving the sample result;
wherein the receiving circuit and the processing circuit are arranged to communicate with the remote apparatus according to the working rate.

9. The communication apparatus of claim 8, wherein the initial receiving rate is equal to the second rate.

10. The communication apparatus of claim 9, wherein the specific sample frequency is equal to a frequency of the second rate.

11. The communication apparatus of claim 8, wherein the initial receiving rate is higher than the first rate, and the specific sample frequency is equal to a data frequency of the initial receiving rate.

12. The communication apparatus of claim 8, wherein the detecting circuit is utilized for:
gathering statistics for symbol changes in the sample result;
determining the input transmitted rate according to the symbol changes so as to generate a determination result; and
setting the working rate as the first rate or the second rate according to the determination result;
wherein a symbol in the sample result is formed by a segment of at least N consecutive bits '0' or bits '1'.

13. The communication apparatus of claim 12, wherein the step of gathering statistics for symbol changes in the sample result comprises:
gathering statistics for a first symbol and a second symbol in the sample result to determine the input transmitted rate;
wherein the first symbol is formed by a segment of at least N consecutive bits '0', and the second symbol is formed by a segment of at least N consecutive bits '1'.

14. The communication apparatus of claim 13, wherein the step of gathering statistics for a first symbol and a second symbol in the sample result to determine the input transmitted rate comprises:
gathering statistics for an average clock cycles of the first symbol's occurrence or the second symbol's occurrence; and
deciding the input transmitted rate by determining whether the average of clock cycles falls within a predetermined range.

15. The communication apparatus of claim 13, wherein the step of gathering statistics for a first symbol and a second symbol in the sample result to determine the input transmitted rate comprises:
gathering statistics for a number of the first symbol to generate a first number;
gathering statistics for a number of the second symbol to generate a second number;
subtracting the first number from the second number to generate a difference value; and
determining the input transmitted rate according to the difference value.

16. The communication apparatus of claim 15, wherein the step of determining the input transmitted rate according to the difference value comprises:
determining the input transmitted rate as the second rate when an error between the difference value and a reference value is smaller than a threshold value; and
determining the input transmitted rate as the first transmission rate when the error between the difference value and the reference value is greater than the threshold value.

17. The communication apparatus of claim 13, wherein the step of gathering statistics for the first symbol and the second symbol in the sample result to determine the input transmitted rate comprises:
determining the input transmitted rate by determining whether the first symbol and the second symbol alternately occur in the sample result.

* * * * *